(12) United States Patent
Sougawa et al.

(10) Patent No.: US 8,198,784 B2
(45) Date of Patent: Jun. 12, 2012

(54) DRIVING DEVICE

(75) Inventors: Tadatomi Sougawa, Sakai (JP); Kazumi Sugitani, Sakai (JP); Shuichi Fujii, Matsubara (JP)

(73) Assignee: Konica Minolta Opto, Inc. (JP)

(*) Notice: Subject to any disclaimer, the term of this patent is extended or adjusted under 35 U.S.C. 154(b) by 55 days.

(21) Appl. No.: 12/716,797

(22) Filed: Mar. 3, 2010

(65) Prior Publication Data

US 2010/0225203 A1    Sep. 9, 2010

(30) Foreign Application Priority Data

Mar. 5, 2009  (JP) .................................. 2009-051592

(51) Int. Cl.
*H02N 2/04* (2006.01)
*H01L 41/053* (2006.01)

(52) U.S. Cl. ........................................ 310/328; 310/348

(58) Field of Classification Search ............ 310/323.01–323.21, 328, 348
See application file for complete search history.

(56) References Cited

U.S. PATENT DOCUMENTS

| 5,225,941 | A  | * | 7/1993  | Saito et al. ..................... 359/824 |
| 7,501,741 | B2 | * | 3/2009  | Naka et al. ..................... 310/328 |
| 7,847,470 | B2 | * | 12/2010 | Kuroda .......................... 310/348 |
| 2009/0039875 | A1 |   | 2/2009  | Hoshino .................. 324/207.21 |

FOREIGN PATENT DOCUMENTS

| JP | 5-166557 A    | 7/1993 |
| JP | 2005-45110 A  | 2/2005 |
| JP | 2006-292396 A | 10/2006 |

* cited by examiner

*Primary Examiner* — Derek Rosenau
(74) *Attorney, Agent, or Firm* — Cantor Colburn LLP

(57) ABSTRACT

A driving device 1 includes an electromechanical transducer 3, a shaft-like vibrating member 4 vibrated in its axial direction by the electromechanical transducer 3, a movable member 5 which engaging frictionally with the vibrating member 4, a substrate 6 with a sensor 14 mounted thereon for detecting a position of the movable member 5, and a holding member 7 fixed to the substrate 6 and having a holding section 20 for holding the vibrating member 4 and a positioning section 27 for positioning the sensor.

13 Claims, 10 Drawing Sheets

DRIVING DEVICE

This application is based on application No. 2009-51592 filed in Japan, the contents of which are hereby incorporated by reference.

FIELD OF THE INVENTION

The present invention relates to a vibrating type driving device.

DESCRIPTION OF THE RELATED ART

An example of vibrating type driving devices is described in JP 2006-292396 A in which a shaft-like vibrating member is asymmetrically vibrated in an axial direction through asymmetrical expansion and contraction of an electromechanical transducer so that a movable member which engaging frictionally with the vibrating member is displaced with respect to the vibrating member in a sliding manner, the vibrating type driving device having a sensor to detect a position of the movable member. The sensor described in JP 2006-292396 A is for detecting a magnetic field formed by a magnet provided on the movable member with use of a plurality of detecting elements, the output values of which are substituted for a predetermined computing equation to calculate a position of the movable member.

In such a driving device, a substrate with the sensor mounted thereon is fixed onto a frame holding other components, which causes increase in the number of components and assembly steps and thereby generates a problem of higher costs.

In the sensor described in JP 2006-292396 A, changes in a vertical distance between the magnet and the sensor change a profile of intensity of magnetic field to be detected, which may damage the linearity of arithmetic output values with respect to actual positions of the movable member.

In mounting of small electronic components like the sensor described in JP 2006-292396 A, it is used a reflow technique that is including forming electrode pads on contact surfaces of a substrate and an electronic component so that they overlap each other, applying solder in advance to at least one of the electrode pads, heating the substrate placed on top of the electronic component to melt the solder.

In that case, the electronic component is positioned so that the electrode pads face each other due to the surface tension and wettability of the electrode pads, and a certain amount of positioning error must be permitted. Particularly, variation in application quantity of the solder tends to cause nonuniform floating up of the electronic component with reference to the substrate.

Accordingly, in order to enhance the position detection accuracy of the movable member in the driving device, further complication of the structure and assembly steps, such as providing the sensor with a pin to be inserted into the substrate, were required as disclosed in JP H5-166557 A and JP 2005-45110 A.

SUMMARY OF INVENTION

In view of the above problem, an object of the present invention is to provide a driving device allowing accurate detection of the position of a movable member while having simple structure.

In order to accomplish the above object of the present invention, there is provided a driving device including an electromechanical transducer, a shaft-like vibrating member vibrated in its axial direction by the electromechanical transducer, a movable member engaging frictionally with the vibrating member, a substrate with a sensor mounted thereon for detecting a position of the movable member, and a holding member fixed to the substrate for holding the vibrating member, wherein the substrate has a fixing section for fixing the holding member.

According to this configuration, the substrate is used as a frame of the driving device, so that simple structure and easy assembling work are implemented.

In the driving device of the present invention, the holding member may have a positioning section for positioning the sensor.

According to this configuration, even when the sensor is fixed to the substrate by reflow of solder without using a special jig, relative position between the vibrating member and the sensor becomes constant via a holding member, which ensures high accuracy in position detection of the movable member by the sensor.

In the driving device of the present invention, the positioning section may press the sensor to the substrate.

According to this configuration, the sensor is held between the positioning section of the holding member and the substrate for positioning. Accordingly, positioning the holding member with reference to the substrate makes the relative position between the vibrating member and the sensor constant, and therefore it becomes possible to accurately detect a position of the movable member engaging with the vibrating member.

The driving device of the present invention may further include a guide member held in parallel with the vibrating member and slidably engaging with the movable member, in which the sensor may be mounted between the vibrating member and the guide member.

According to this configuration, a position of the movable member can be accurately detected by placing a component which is to be detected by the sensor at a position located between the vibrating member of the movable member and the guide member.

In the driving device of the present invention, the sensor and the holding member may be fixed to the substrate with solder.

According to this configuration, a sensor and a holding member can be fixed to the substrate in the same process, so that assembly cost can be reduced.

In the driving device of the present invention, the fixing section may comprise a fixation hole open on the substrate, and the holding member may have an insertion section press fitted into the fixation hole.

According to this configuration, employing a press fit structure facilitates assembly.

In the driving device of the present invention, the holding member may be fixed to the fixing section with solder.

According to this configuration, the holding member can be fixed to the substrate concurrently with mounting of electronic components on the substrate.

In the driving device of the present invention, the holding member may be made by bending a metal plate, and more preferably be made by bending a metal plate in C shape.

According to this configuration, a holding member with sufficient strength can be formed easily. Moreover, bending a metal plate in C shape stabilizes the shape and maintains dimension accuracy.

In the driving device of the present invention, the fixing section may comprise a fixation hole open on the substrate, and the holding member may be made of a metal plate and may have a reference end portion contacting with a surface of the substrate and an insertion section press fitted into the fixation hole.

According to this configuration, the holding member and the sensor can temporarily be fixed by inserting the insertion section of the holding member into the fixation hole, which ensures efficient fixation of the holding member and the sensor onto the substrate.

In the driving device of the present invention, the holding member may have a plurality of holding sections having a holding hole formed for insertion of the vibrating member and positioned so as to be orthogonal to the vibrating member and the substrate, and a reinforcement section connecting the holding sections to each other.

According to this configuration, the holding members hold each other so as not to be inclined, and therefore it becomes possible to prevent the sensor from floating up from the substrate due to inclination of the holding members.

In the driving device of the present invention, the holding member may have a holding section having a holding hole formed for insertion of the vibrating member and positioned so as to be orthogonal to the vibrating member and the substrate, and a reinforcement section extending in a bent manner from the holding section and contacting with the substrate.

According to this configuration, since the reinforcement section prevents inclination of the holding member, it becomes possible to prevent the sensor from floating up from the substrate.

In the driving device of the present invention, a part of the movable member may project from a area upon the substrate.

According to this configuration, even when a large driven object is driven with a short distance between the substrate and the vibrating member, the driven object does not interfere with the substrate.

According to the present invention as disclosed, a substrate is used as a frame of a driving device, so that simple structure and easy assembling work are implemented. Moreover, since the holding member is provided with a positioning section for positioning a sensor, it becomes possible to keep relative position between a vibrating member and a sensor constant via the holding member, to accurately detect a position of the movable member, and to provide a driving device allowing accurate positioning with lower costs.

BRIEF DESCRIPTION OF THE DRAWINGS

These and other objects and features of the present invention will become apparent from the following description taken in conjunction with the preferred embodiments thereof with reference to the accompanying drawings, in which.

It is to be noted that in the following description of the preferred embodiment of the present invention, components identical to those described before are designated by identical reference numerals to omit redundant explanation.

DETAILED DESCRIPTION OF THE PREFERRED EMBODIMENT

Figure 1:
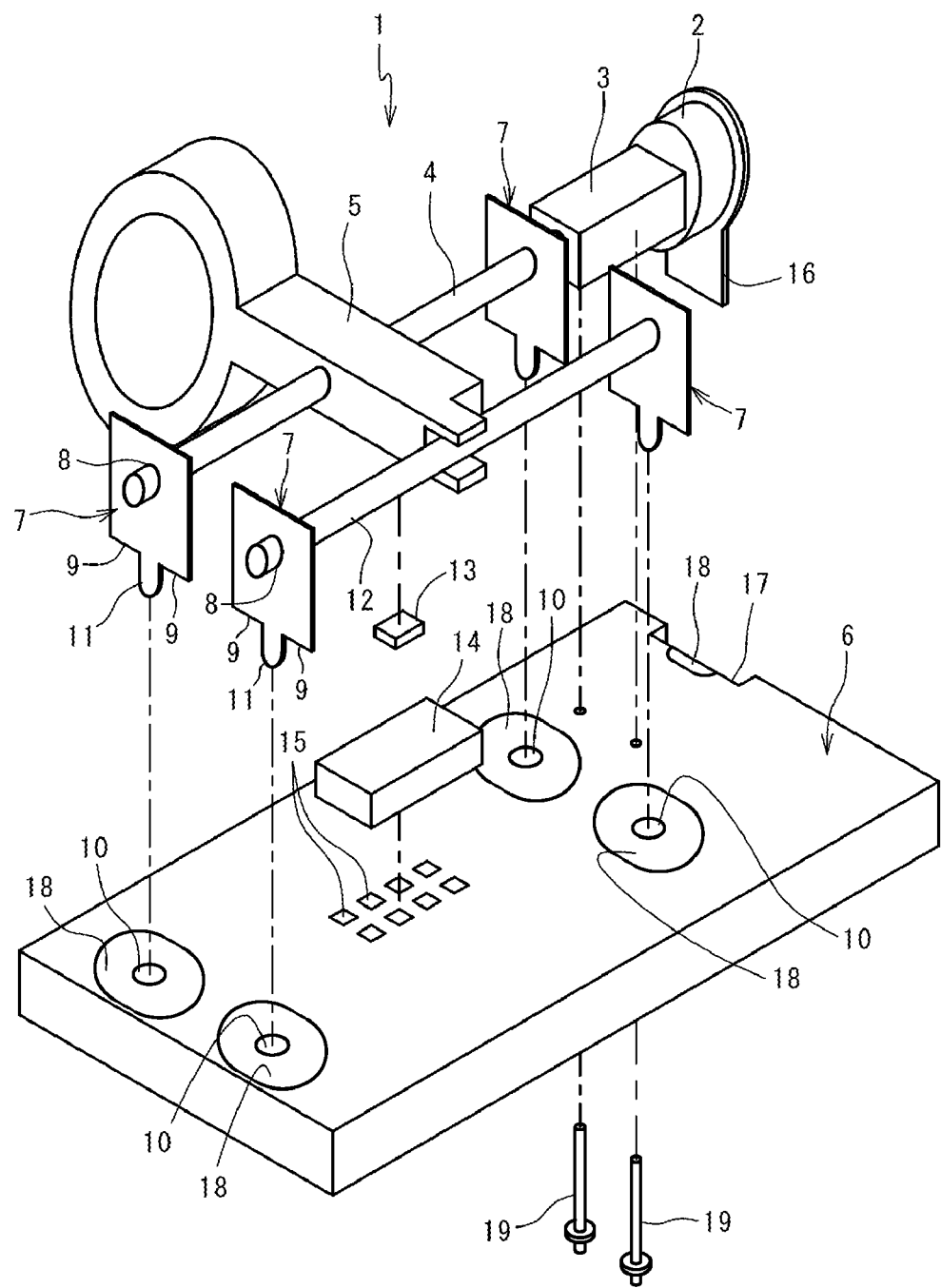
FIG. 1 is an exploded perspective view of a driving device of a first embodiment of the present invention.
Figure 2:
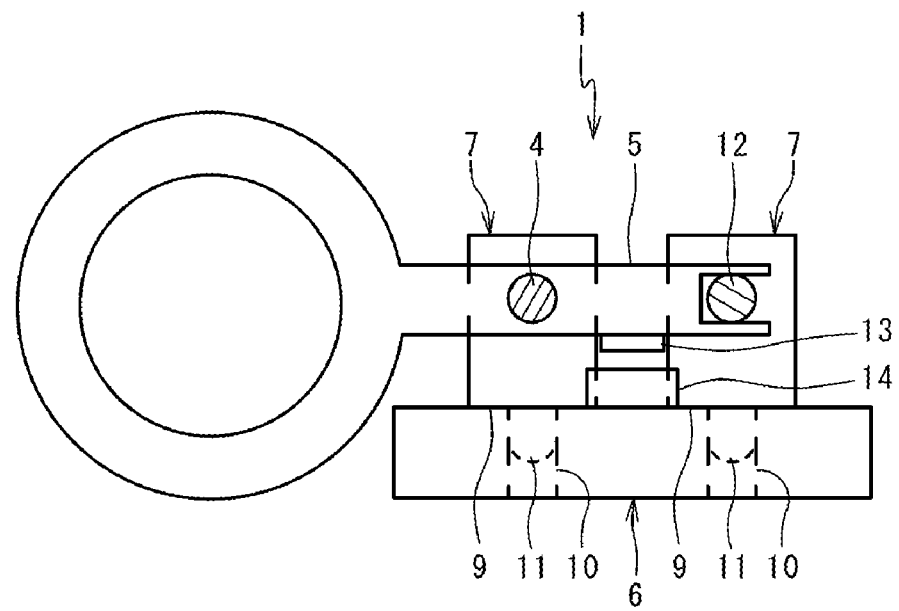
FIG. 2 is a cross sectional view of the driving device of FIG. 1.
Figure 3:
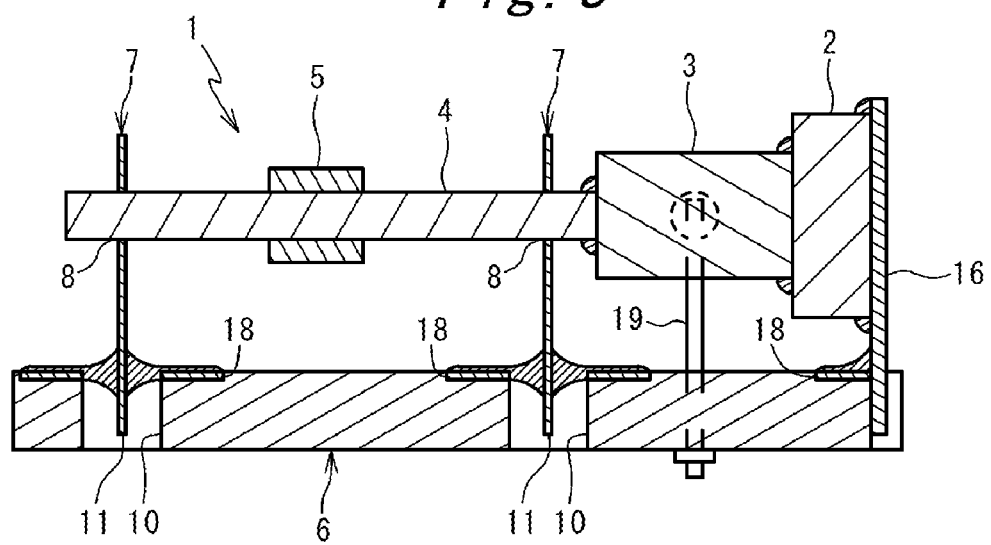
FIG. 3 is an axial sectional view of the driving device of FIG. 1.

FIG. 1 through 3 show the configuration of a driving device 1 according to a first embodiment of the present invention. The driving device 1 of this embodiment includes a piezoelectric element (electromechanical transducer) 3 with one end bonded to a weight 2, a shaft-like vibrating member 4 which is bonded to the other end of the piezoelectric element 3 and vibrates in its axial direction by expansion and contraction of the piezoelectric element 3, and a movable member 5 which is formed integrally with a lens mounting rim for holding a lens engaging frictionally with the vibrating member 4.

The vibrating member 4 is slidably held with both ends being respectively inserted into holding holes 8 formed in two holding members 7 to be fixed to a substrate 6. The holding member 7 is made of a metal plate with a thickness of 0.2 mm for example, and has reference end portions 9, contacting with a surface of the substrate 6. The each reference end portion 9 has an insertion section 11 to be inserted into a fixation hole (fixing section) 10 provided in the substrate 6 in a protruding manner. Accordingly, the holding member 7 is accurately positioned and secured in a direction perpendicular to the plate surface of the substrate 6 to hold the vibrating member 4 in parallel with the substrate 6.

The driving device 1 has a shaft-like guide member 12 held in parallel with the vibrating member 4 by holding members 7 identical with the holding members 7 holding the vibrating member 4, and the movable member 5 engages with the guide member 12 slidably. This configuration prevents the movable member 5 from rotating around the vibrating member 4.

A magnet 13 is attached to a surface of the movable member 5 facing the substrate 6, and a position sensing device 14 having two Hall elements for detecting the intensity of a magnetic field generated by the magnet 13 is mounted on the substrate 6. The driving device 1 derives a position of the magnet 13 based on the intensity of magnetic field detected by the position sensing device 14. The magnet 13 and the position sensing device 14 are provided between the vibrating member 4 and the guide member 12. The position sensing device 14 has for example, ball grid array structure to be soldered electrically and mechanically to a corresponding pad electrode 15 formed on the surface of the substrate 6.

The weight 2 has a supporting plate 16 stuck on a surface opposite to the piezoelectric element 3. The supporting plate 16 fits into a fitting groove 17 formed in an end portion of the substrate 6 to retain the weight 2 so as to prevent the vibrating member 5 from slipping out of the holding hole 8 of the holding member 7.

A metal layer 18 is provided around each of the fixation hole 10 and the fitting groove 17 of the substrate 6, so that the holding member 7 and the supporting plate 16 can be fixed to the substrate 6 with solder.

The driving device 1 also has an electrode pin 19 which extends through the substrate 6 so as to contact with the electrode of piezoelectric element 3 and is connected by solder or electrically conductive adhesives for applying drive voltage to the piezoelectric element 3.

The driving device 1 is assembled by connecting the weight 2, the piezoelectric element 3, the vibrating member 4 and the supporting plate 16 to each other, or connecting the magnet 13 to the movable member 5 in advance with use of adhesive bonds, press fitting the insertion section 11 of the holding member 7 into the fixation hole 10 of the substrate 6 having the metal layer 18 coated with solder paste so as to temporarily engage other components with the substrate 6, and reflowing the solder paste in a furnace to fix the holding member 3 and the supporting plate 16 to the substrate 6. In this case, the position sensing device 14 is positioned with respect to the pad electrode 15 of the substrate 6 due to surface tension of the reflowed solder.

Since the substrate 6 is used as a frame for holding other components in the driving device 1 of this embodiment, the number of components is small. Further in the driving device 1, only the holding member 7, which is accurately positioned by the reference end portion 9 contacting with the substrate 6, is interposed between the substrate 6 and the vibrating member 4 and between the substrate 6 and the guide member 12, hence the positions of the vibrating member 4 and the guide member 12 relative to the substrate 6 with the position sensing device 14 mounted thereon are constant. As a result, the relative position of the movable member 5 which engages with the vibrating member 4 and the guide member 12 with respect to the position sensing device 14 becomes constant, so that a position of the movable member 5 in the axial direction of the vibrating member 4 can be detected accurately.

In the driving device 1 of the embodiment, one end of the movable member 5 projects from a area upon the substrate 6 to hold a lens so that the lens is protruded. This makes it possible to prevent the lens from interfering the substrate 6 without making the holding member 7 higher for increasing a distance between the substrate 6 and the vibrating member 4.

Figure 4:
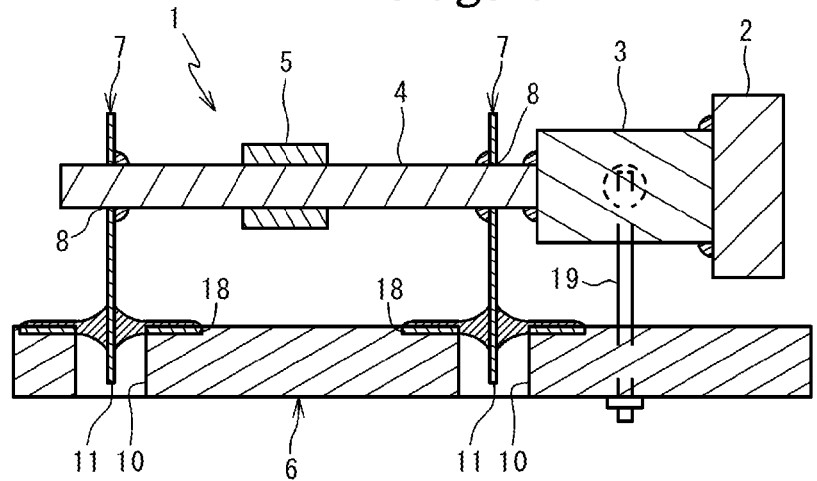
FIG. 4 is an axial sectional view showing an alternative connection between components of the driving device of FIG. 1.

Although, in this embodiment, the vibrating member 4 is positioned with respect to the holding member 7 in the axial direction by the supporting plate 16, the vibrating member 4 may be bonded to the holding member 7 as is shown in an alternative connection shown in FIG. 4. In this alternative, the vibrating member 4 vibrates in the axial direction by deforming the holding member 7. However, the elastic force of the holding member 7 in a vibrating range is not large, and therefore the vibrating characteristics are not much different from those in the case where the vibrating member 4 slides within the holding hole 8.

Figure 5:
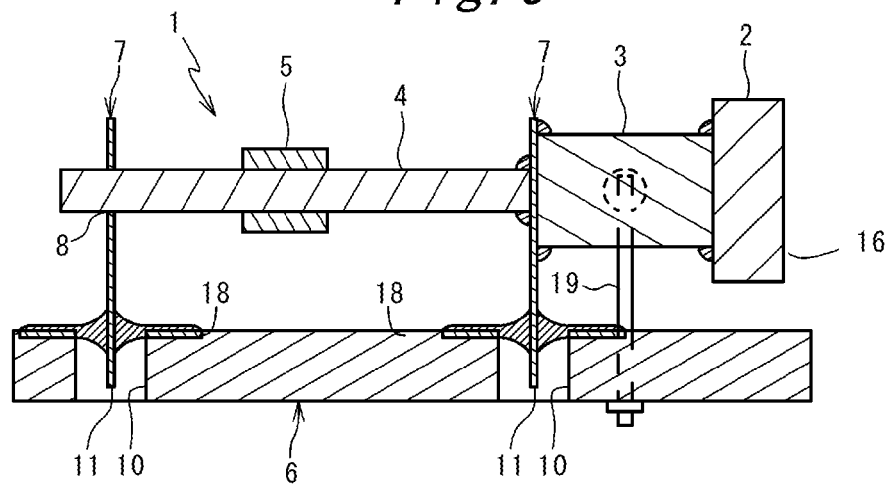
FIG. 5 is an axial sectional view showing another alternative connection between components of the driving device of FIG. 1.

Moreover, a holding member 7 may be interposed between the piezoelectric element 3 and the vibrating member 5 as shown in another alternative connection shown in FIG. 5. More specifically, the piezoelectric element 3 may be bonded onto one surface of the holding member 7, while the vibrating member 4 may be bonded to the opposite surface of the holding member 7.

Figure 6:
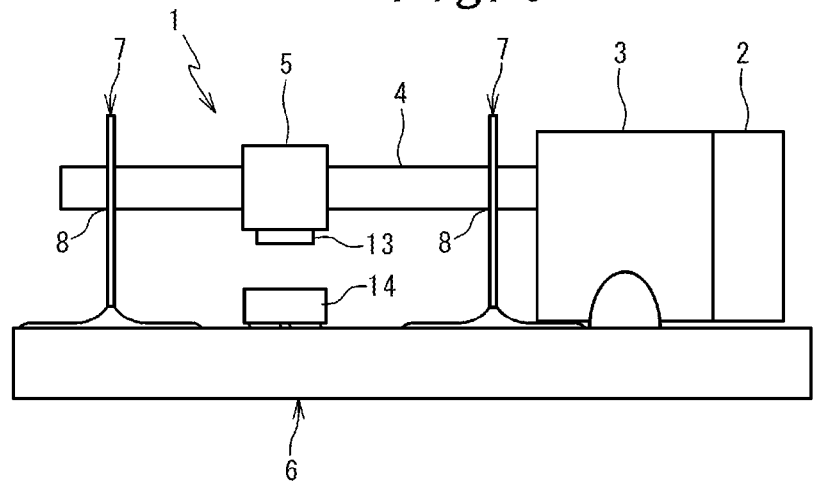
FIG. 6 is a side view showing a still another alternative connection between components of the driving device of FIG. 1.

Moreover, as shown in still another alternative connection shown in FIG. 6, the piezoelectric element 3 may be increased in size and the vibrating member 5 may be eccentrically bonded to the piezoelectric element 3 so that the piezoelectric element 3 is directly put on the substrate 6 so as to allow soldering. In this alternative, only an electrode layer of the piezoelectric element 3 is expanded or a dummy material other than a piezoelectric material is placed so that the piezoelectric element 3 can substantially be connected to the substrate 6 directly.

Figure 7:
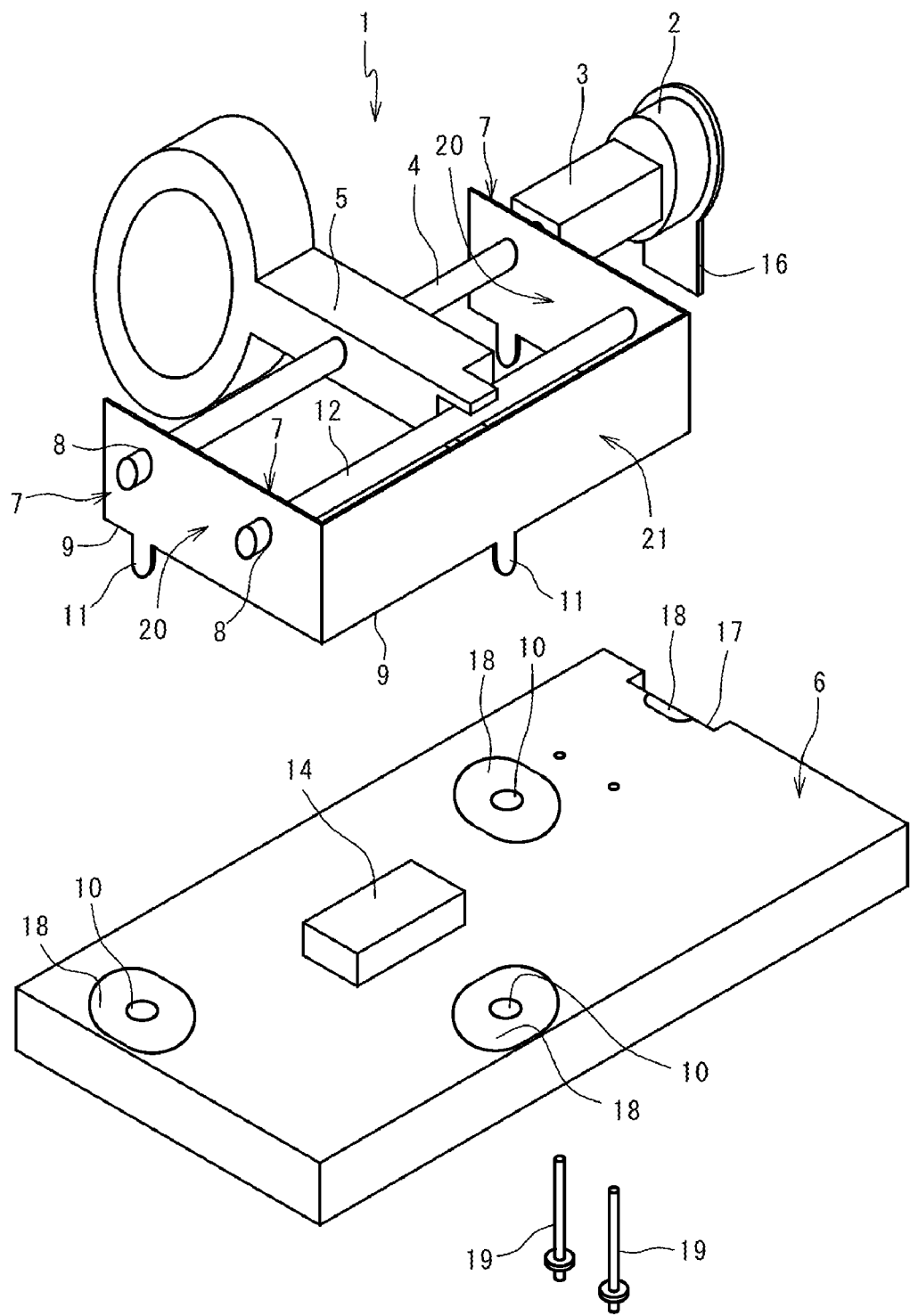
FIG. 7 is an exploded perspective view of a driving device of a second embodiment of the present invention.

Now, a driving device 1 of a second embodiment of the present invention is shown in FIG. 7. In the driving device 1 of this embodiment, a holding member 7 for holding both the ends of a vibrating member 4 is integrally formed by bending a metal plate in C shape to reduce the number of components.

The holding member 7 is composed of a pair of holding sections 20 having a holding hole 8 provided for holding the vibrating member 4 and the guide member 12, and a reinforcement section 21 for connecting end portions of the holding sections 20 with each other. The reinforcement section 21, in a manner similar to the holding section 20, has a reference end portion 9 contacting with the surface of the substrate 6 and an insertion section 11 inserted into a fixation hole 10 of a substrate 6.

Since the holding member 7 of this embodiment has the reinforcement section 21, it is ensured that the holding section 20 is vertically secured without inclining toward the substrate 6. Therefore, since a position of the vibrating member 4 relative to the substrate 6 is constant, the position detection accuracy of the movable member 5 is enhanced. Moreover, since frictional resistance between the vibrating member 4 and the holding hole 8 remains unvaried, constant driving performance is achieved.

Figure 8:
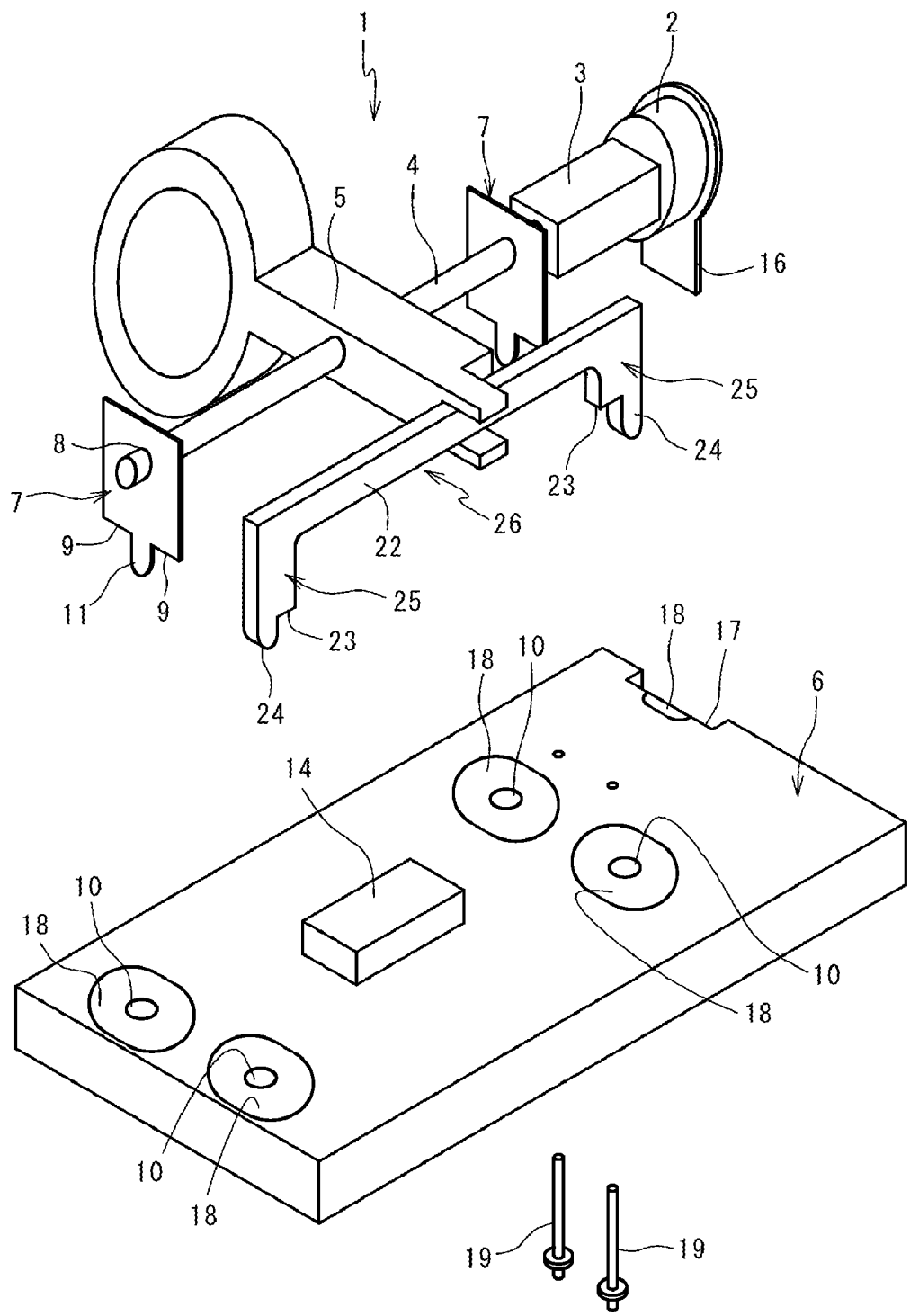
FIG. 8 is an exploded perspective view of a driving device of a third embodiment of the present invention.

Now, a driving device 1 of a third embodiment of the present invention is shown in FIG. 8. The driving device 1 of this embodiment includes a guide member 26 composed of a square column-like guide section 22 slidably engaging with the movable member 5 and a holding section 25 having a reference end portion 23 contacting with a surface of a substrate 6 and an insertion section 24 inserted into a fixation hole 10. This configuration also allows reduction in the number of components.

Figure 9:
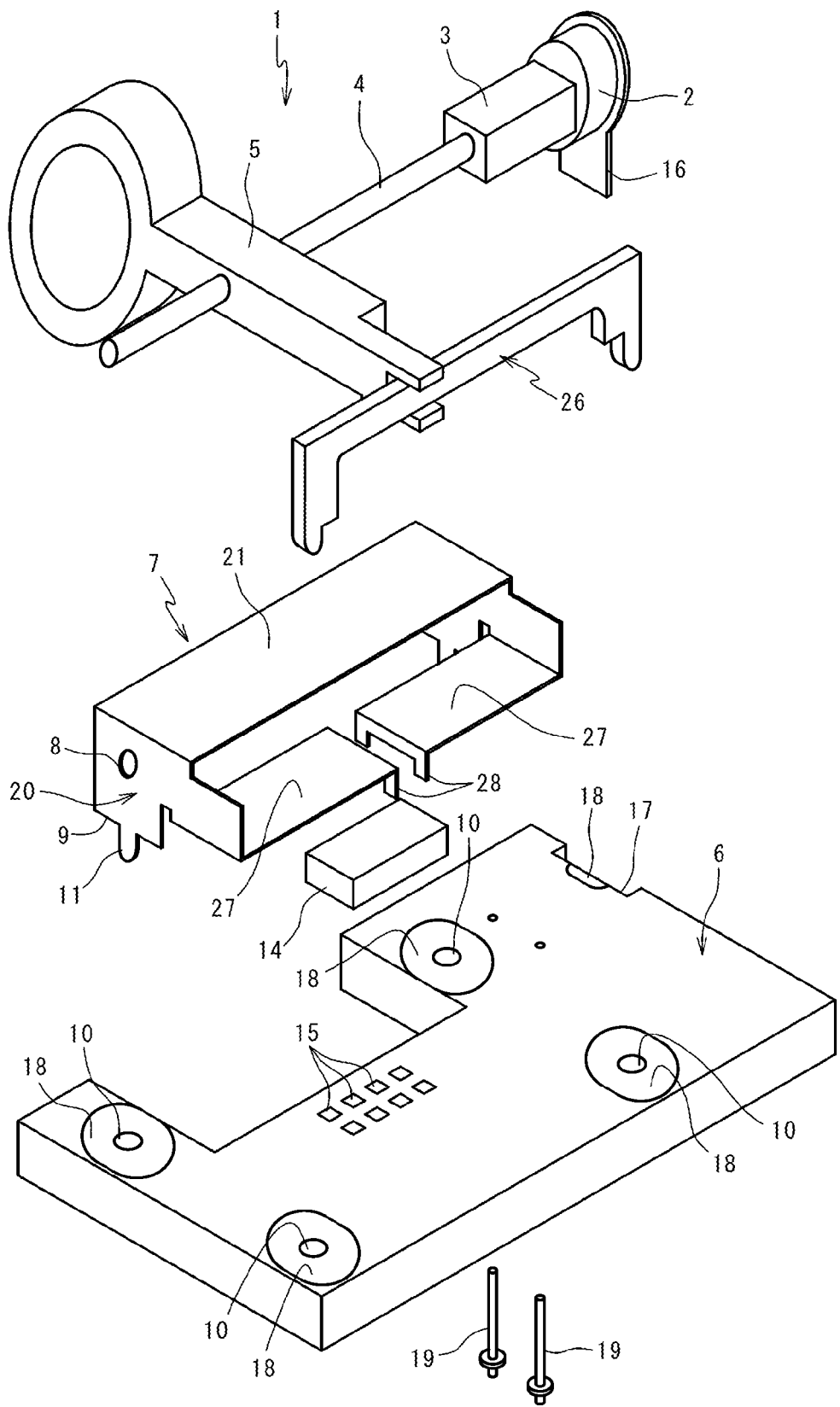
FIG. 9 is an exploded perspective view of a driving device of a fourth embodiment of the present invention.

Now, a driving device 1 of a fourth embodiment of the present invention is shown in FIG. 9. A holding member 7 of the driving device 1 of this embodiment includes a holding section 20 having a holding hole 8 for holding a vibrating member 4 and a guide member 13, a reinforcement section 21 for connecting upper ends of the holding sections 20 extending in parallel with a substrate 6, and a positioning section 27 extending from the holding section 20 to over a position sensing device 14 for pressing the position sensing device 14 to the substrate 6 with its spring characteristic. The positioning section 27 has claws 28 for positioning the position sensing device 14 in a direction parallel to the substrate 6 and orthogonal to the vibrating member 4.

It is to be noted that in this embodiment, the holding member 7 is made of paramagnetic materials so that magnetic field detection by the position sensing device 14 is not hindered.

In this embodiment, since the position sensing device 14 is pressed to the substrate 6 by the positioning section 27 at the time of reflowing solder, it is possible to prevent the position sensing device 14 from floating up due to variation in quantity of solder and the like. Accordingly, in this embodiment, a distance between the movable member 5 and the position sensing device 14 in a direction perpendicular to the substrate 6 is maintained constant.

It is to be noted that in the holding member 7, reaction force of the pressing force of the positioning section 27 to the position sensing device 14 operates in a direction of pulling the insertion section 11 from the fixation hole 10 of the substrate 6, and therefore in the present invention, it is necessary to design the device so that fitting force of the insertion section 11 and the fixation hole 10 may be smaller than elastic force of the positioning section 27.

In the case of using the position sensing device 14 for detecting positions with use of magnetic, if a vertical distance between the position sensing device 14 and the magnet 14 shifts from an ideal distance, a profile of the detected intensity of magnetic field with respect to displacement of the movable member 5 is distorted, thereby causing a problem of deteriorated linearity of position detection. However, in this embodiment, since the positioning section 27 prevents the position sensing device 14 from floating up, the linearity of position detection is secured.

Figure 10:
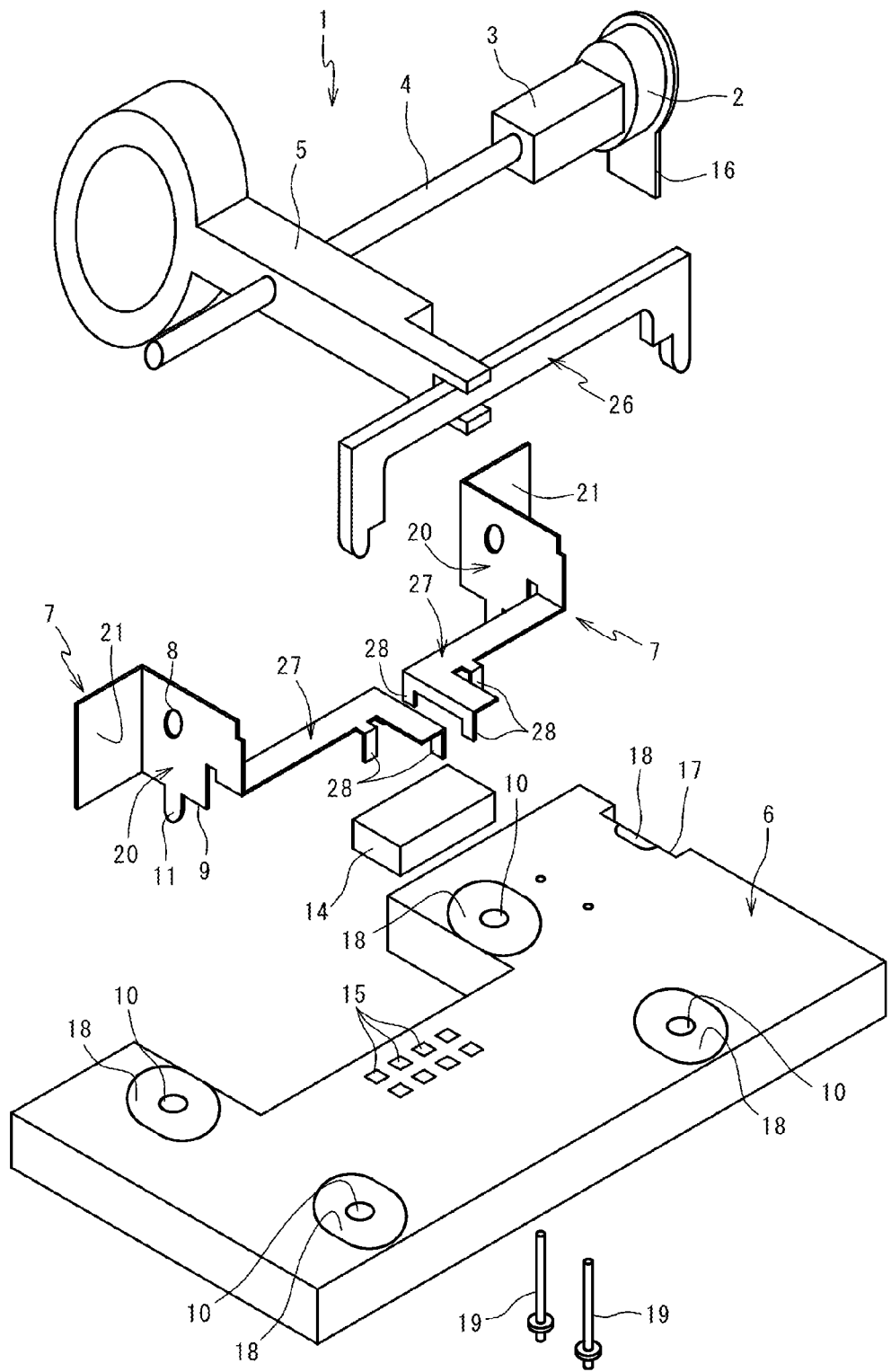
FIG. 10 is an exploded perspective view of a driving device of a fifth embodiment of the present invention.

Now, a driving device 1 of a fifth embodiment of the present invention is shown in FIG. 10. Each of two holding members 7 of the driving device 1 of this embodiment independently supports respective end of a vibrating member 4 and has a reinforcement section 21 which extends from a holding section 20 in an opposite direction of a positioning section 27 in a bent manner so as to contact with a substrate 6, hence which counteracts a spring characteristic of the positioning section 27 to prevent the holding section 20 from inclining.

The positioning section 27 of this embodiment has a plurality of claws 28 contacting with a lateral section of a position sensing device 14 so that not only the position sensing device 14 is pressed to the substrate 6 but also the sensing device 14 can be positioned in a direction parallel to the substrate 6.

Figure 11:
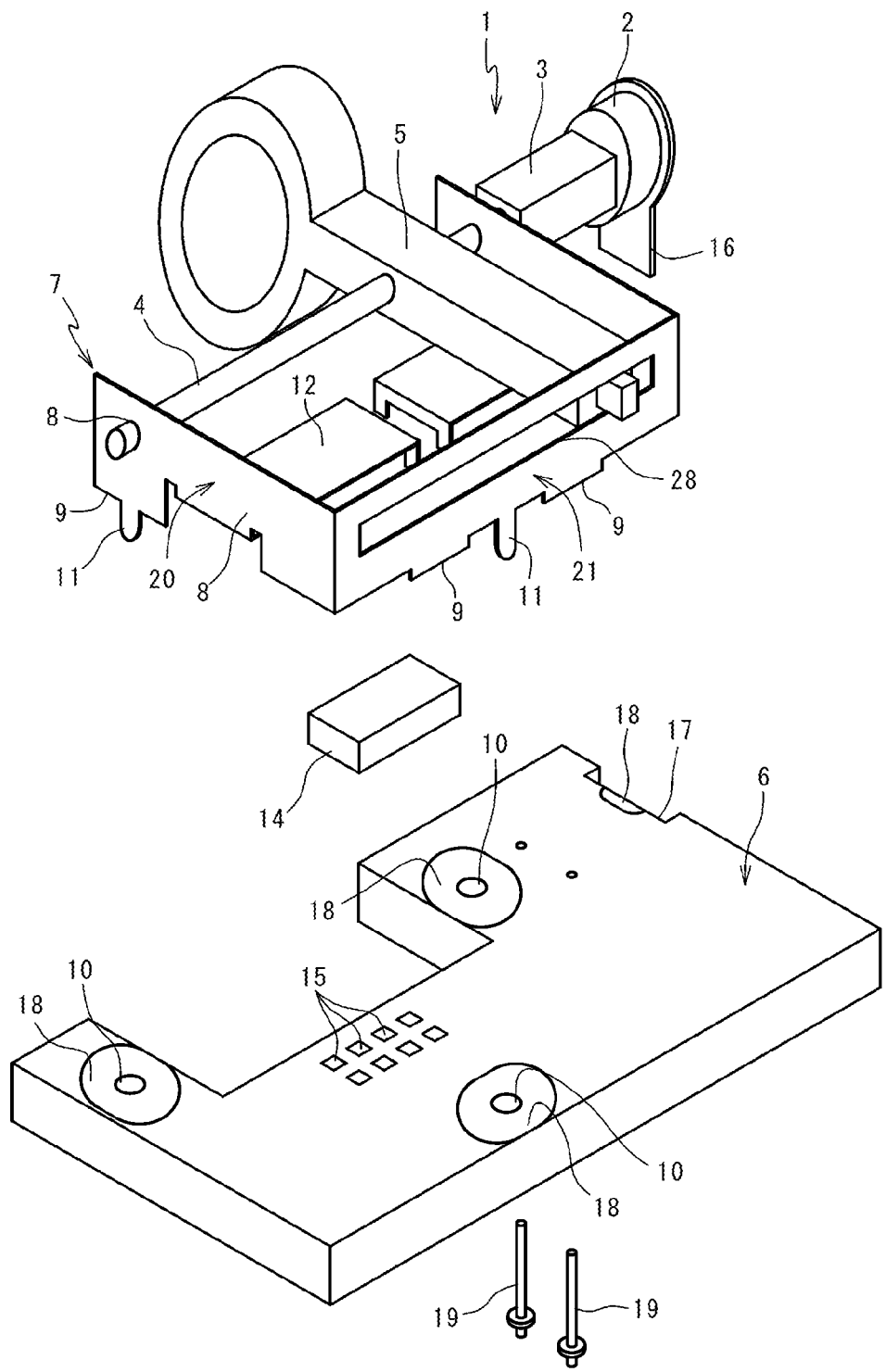
FIG. 11 is an exploded perspective view of a driving device of a sixth embodiment of the present invention.

Now, a driving device 1 of a sixth embodiment of the present invention is shown in FIG. 11. A holding member 7 of this embodiment has a guide hole 28 formed in a reinforcement section 21 for connecting holding sections 20 which respectively hold both ends of a vibrating member 4 slidably engages with a movable member 5, so that the holding member 7 also serves as a guide member which prevents the movable member 5 from rotating around the vibrating member 4.

As is shown in this embodiment, a reference end portion 9 of the holding member 7 may be formed partially, and may be formed away from an introducing section 11.

Figure 12:
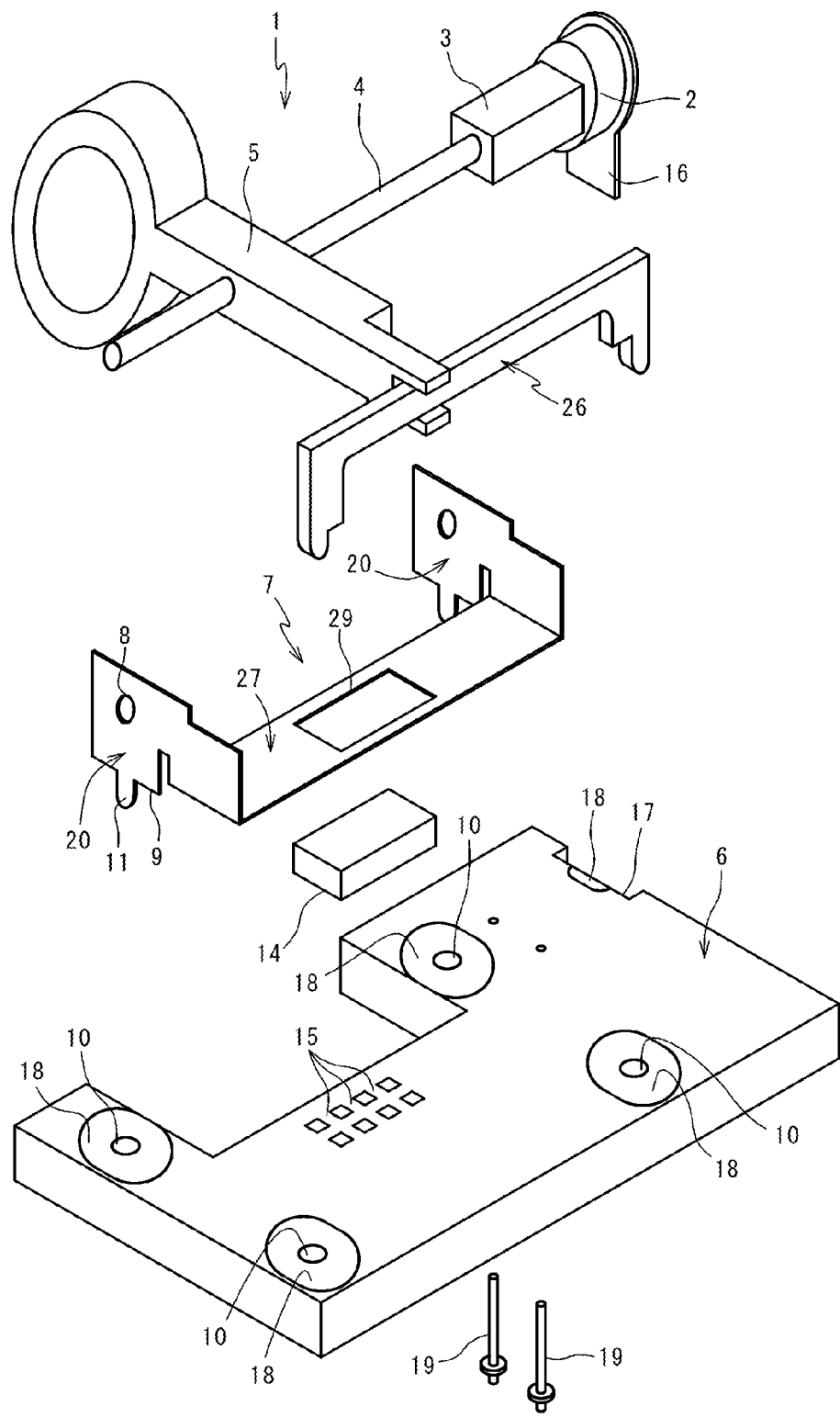
FIG. 12 is an exploded perspective view of a driving device of a seventh embodiment of the present invention.

Now, a driving device 1 of a seventh embodiment of the present invention is shown in FIG. 12. A holding member 7 of this embodiment has a positioning section 27 extends in parallel with a substrate 6 so as to connect holding sections 20 of both sides, and an opening 29 formed therein engages with a position sensing device 14, by which the position sensing device 14 is positioned in a direction parallel to the substrate 6.

Figure 13:
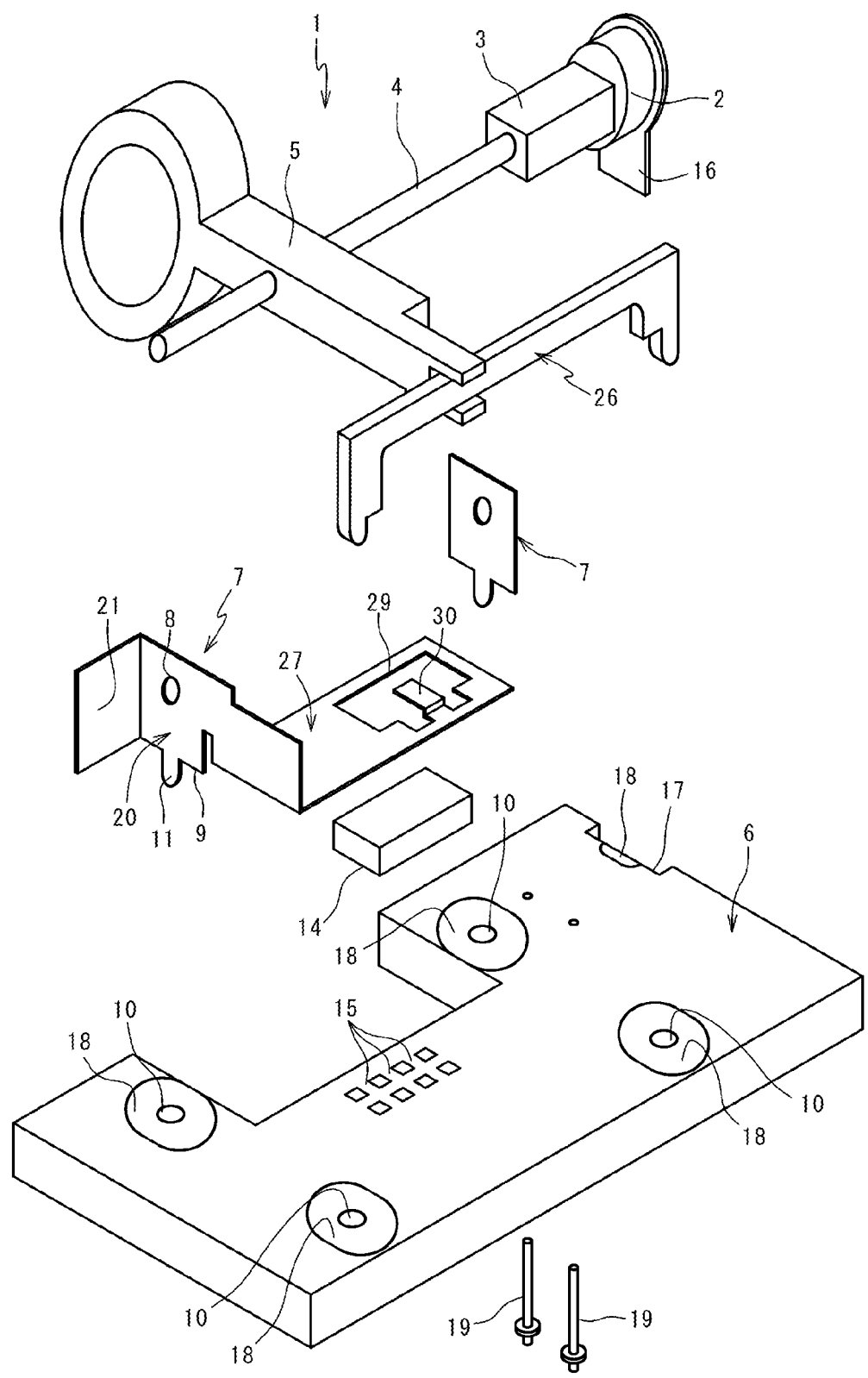
FIG. 13 is an exploded perspective view of a driving device of an eighth embodiment of the present invention.

Now, a driving device 1 of an eighth embodiment of the present invention is shown in FIG. 13. Each of two holding members 7 of this embodiment independently holds respective end of a vibrating member 4. And only one of Holding members 7 has a positioning section 27 and a reinforcement section 21 extending in an opposite direction of the positioning section 27.

The positioning section of this embodiment has a finger 30 projecting over an opening 29, which engages with a position sensing device 14, to press the position sensing device 14 to a substrate 6.

As is clear from a number of embodiments disclosed, the present invention may be embodied in various configurations which position and hold a vibrating member and preferably a position sensing device with reference to a substrate, and therefore is not in all respects restricted to the configurations in the embodiments disclosed.

The invention claimed is:

1. A driving device, comprising:
   an electromechanical transducer;
   a shaft-like vibrating member vibrated in its axial direction by the electromechanical transducer;
   a moveable member engaging frictionally with the vibrating member;
   a substrate with a sensor mounted thereon for detecting a position of the movable member; and
   a holding member for holding the vibrating, wherein
   the substrate has a fixing section for fixing the holding member;
   wherein the substrate is a circuit board comprising an electrical circuit; and
   the sensor is electrically connected to the electrical circuit without wiring.

2. The driving device according to claim 1, wherein the holding member has a positioning section for positioning the sensor.

3. The driving device according to claim 2, wherein the positioning section presses the sensor to the substrate.

4. The driving device according to claim 1, further comprising
   a guide member held in parallel with the vibrating member and slidably engaging with the movable member, wherein
   the sensor is mounted between the vibrating member and the guide member.

5. The driving device according to claim 1, wherein the sensor and the holding member are fixed to the substrate with solder.

6. The driving device according to claim 1, wherein
   the fixing section comprises a fixation hole open on the substrate, and
   the holding member has an insertion section press fitted into the fixation hole.

7. The driving device according to claim 1, wherein the holding member is fixed to the fixing section with solder.

8. The driving device according to claim 1, wherein the holding member is made by bending a metal plate.

9. The driving device according to claim 1, wherein the holding member is made by bending a metal plate in C shape.

10. The driving device according to claim 1, wherein
    the fixing section comprises a fixation hole open on the substrate, and
    the holding member is made of a metal plate and has a reference end portion contacting with a surface of the substrate and an insertion press fitted into the fixation hole.

11. The driving device according to claim 1, wherein
    the holding member has a plurality of holding sections having a holding hole formed for insertion of the vibrating member and positioned so as to be orthogonal to the vibrating member and the substrate, and a reinforcement section connecting the holding sections to each other.

12. The driving device according to claim 1, wherein
    the holding member has a holding section having a holding hole formed for insertion of the vibrating member and positioned so as to be orthogonal to the vibrating member and the substrate, and a reinforcement section extending in a bent manner from the holding section and contacting with the substrate.

13. The driving device according to claim 1, wherein a part of the movable member projects from the area upon the substrate.

* * * * *